United States Patent [19]

Mallett et al.

[11] Patent Number: 4,992,213

[45] Date of Patent: Feb. 12, 1991

[54] CLEANING COMPOSITION, OIL DISPERSANT AND USE THEREOF

[76] Inventors: G. Troy Mallett, 208 Edie Ann Dr., Lafayette, La. 70508; Edward E. Friloux, 204 Notre Dame Dr., Lafayette, La. 70506; David I. Foster, 6914 Windmill Ln., Lake Charles, La. 70605

[21] Appl. No.: 370,823

[22] Filed: Jun. 23, 1989

[51] Int. Cl.$^5$ .................... B01F 3/08; B01F 17/28; C11D 1/94; C11D 3/43

[52] U.S. Cl. .................... 252/546; 134/40; 210/749; 210/929; 210/925; 252/153; 252/173; 252/174.21; 252/312; 252/351; 252/353; 252/354; 252/355; 252/548; 252/550; 252/DIG. 7; 252/DIG. 14

[58] Field of Search .............. 134/40; 210/749, 922, 210/925; 252/153, 173, 174.21, 312, 351, 353, 354, 355, 546, 548, 550, DIG. 1, DIG. 5, DIG. 7, DIG. 13, DIG. 14, 390, 391, 392

[56] References Cited

U.S. PATENT DOCUMENTS

| | | | |
|---|---|---|---|
| 3,869,399 | 4/1975 | Collins | 252/118 |
| 3,998,733 | 12/1976 | Blanchard | 210/59 |
| 4,110,213 | 8/1978 | Tennant | 210/59 |
| 4,235,898 | 11/1980 | Watanabe | 424/245 |
| 4,248,733 | 2/1981 | States | 252/355 |
| 4,421,681 | 12/1983 | Hirota | 252/541 |
| 4,486,328 | 12/1984 | Knott | 252/117 |
| 4,554,098 | 11/1985 | Klisch | 252/547 |
| 4,595,526 | 6/1986 | Lai | 210/749 |

*Primary Examiner*—Dennis Albrecht
*Attorney, Agent, or Firm*—Thomas S. Keaty

[57] ABSTRACT

The invention relates to a composition which is designed to be used as a cleaning agent and oil dispersant. The composition has a number of active ingredients mixed with water. The solution provides for the use of such active ingredients as sodium lauryl sulfate, cocamidopropyl betaine, ethoxylated nonylphenol, lauric acid diethanolamide, diethanolamine and propylene glycol. Preferred compositions contain the following ingredients mixed in an aqueous base: from 0.02% to 2.25% by total weight of sodium lauryl sulfate, from 0.02% to 1.95% by total weight of cocamidopropyl betaine, from 0.002% to 0.25% by total weight of ethoxylated nonylphenol, from 0.04% to 4.25% of lauric acid diethanolamide, from 0.02% to 1.85% by total weight of diethanolamine and from 0.02% to 1.85% by total weight of propylene glycol.

8 Claims, No Drawings

CLEANING COMPOSITION, OIL DISPERSANT AND USE THEREOF

BACKGROUND OF THE INVENTION

This invention relates to cleaning compositions for use as dispersant for oil as well as for other useful applications.

It has long been a serious problem associated with production and transportation of oil, removal of an accidental oil spill from water surface or from land areas. While various mechanical devices have been designed to remove oil spread on the surface of water, the number of safe methods for removal of oil from land has been limited. In such an environment, it is particularly important to preserve the ecological balance, so as not to destroy living organisms while cleaning oil contamination. In the recent years a new method of removing oil contamination was developed which provides for introduction of microbial genera, which have useful property of reducing the oil content in the environment, while not causing any substantial damage to the environment itself. However, the dispersants known to the applicant so far failed to produce a composition in which microbial general survive, allowing not only clean-up of the oil but also reduction of the oil content during cleanup operation, so that when the contaminants are collected in transport containers, the microbial genera continue to reduce the oil content while being suspended in the viscous liquid, part of which is a known dispersant.

SUMMARY OF THE INVENTION

The present invention is concerned, inter alia, with means for preventing the microbial genera to be destroyed while using a chemical composition to disperse the oil contaminants.

It is an object of the present invention to provide a composition in which microbial genera can survive and continue its useful life.

It is a further object of the present invention to provide a cleaning composition which is completely biodegradable.

It is still a further object of the present invention to provide a cleaning composition which can be easily diluted with water for use as a household cleaner, corrosion and rust inhibitor for metal, general all purpose cleaner and for other similar applications. The cleaning agent of the present invention proved to be an efficient cleaner for protein containing stains, hydrocarbon-based stains, dyes and the like. Depending on the strength of the solution, that is the amount of active ingredients in the composition, the cleaning agent can be used in the numerous applications for cleaning, oil dispersing, etc.

These and other objects of the invention are achieved by provision of a chemical composition which comprises water, an emulsifying agent, such as sodium lauryl sulfate, cocamidopropyl betaine, amphoteric surfactant, anionic surfactant, such as ethoxylated nonylphenol, dispersant such as lauric acid diethanolamide, detergent such as diethanolamine, emulsifier such as propylene glycol, mixed in a water base.

All of the active ingredients have little or no toxicity, each of them acting separately, with no reaction between the components.

Other objects of this invention will be more apparent in the following detailed specification.

DETAILED DESCRIPTION OF THE PREFERRED EMBODIMENT

In accordance with the present invention, a composition of six components in a water base is provided. Sodium lauryl sulfate, which is commercially available in a composition sold under a brand name of Sipon LSB is used as a detergent, emulsifier and thickener. This ingredient is soluble in water and has no toxicity.

Cocamidopropyl betaine in a water solution is available under the trade name Cycloteric BET-C 30.

Ethoxylated nonylphenol, available in a composition sold under trade name Siponic NP-9.5, was selected due to its properties of being soluble in most organic solvents, and helpful as surfactant, petroleum emulsifier and wetting agent. Lauric acid diethanolamide is available in a composition sold under the brand name of Cyclomide LE, and was selected as a non-ionic viscosity booster, dispersant coupler and emulsifier.

Diethanolamine was selected due to its qualities of being soluble in water and serving as detergent for cutting oil and dispersant.

Finally, propylene glycol was selected due to its properties as a solvent for oils, wetting agent emulsifier and a preservative to retard mold and fungi.

The resultant composition affects the oil by breaking it into smaller particles, droplets, depending upon the amount, used, keeps the oil dispersed and forms a buffer zone between the microscopic particles.

In addition, it has the property of adding buoyancy to the oil particles which are being dispersed. The composition of the present invention can be used for dispersing light hydrocarbon-containing oils, as well as those having asphaltic base.

EXAMPLE 1

Into a mixing vessel, 25.07% of pre-mix water was placed. Then 1.5% by total weight of sodium lauryl sulfate LSB was added, while the contents of the mixing vessel were continuously agitated. Then, 1.3% of cocamidopropyl betaine was added with continuous agitation. Subsequently, 0.17% of ethoxylated nonylphenol was added with continuous agitation. Further, 2.83% of lauric acid diethanolamide was added to the vessel with continuous slow agitation. Further, 1.23% by total weight of diethanolamine was added with continuous agitation of the contents of the vessel. Then, 1.23% by weight of propylene glycol was added to the vessel with continuous agitation.

Finally, 66.67% by weight of water was added with continuous agitation. It was noted that the final water addition, when induced into the vessel below the liquid level helps to keep down the formation of foam.

The resultant composition has a pH of 10.4, percentage of active ingredients of 8.26%.

EXAMPLE 2

Into a mixing vessel, 25.07% of pre-mix water was placed. Then 0.02% by total weight of sodium lauryl sulfate was added, while the contents of the mixing vessel were continuously agitated. Then, 0.02% of cocamidopropyl betaine was added with continuous agitation. Subsequently, 0.002% of ethoxylated nonylphenol was added with continuous agitation. Further, 0.04% of lauric acid diethanolamide was added to the vessel with continuous slow agitation. Further, 0.02% by total weight of diethanolamine was added with continuous agitation of the contents of the vessel. Then, 0.02% by weight of propylene glycol was added to the vessel with continuous agitation.

Finally, 74.808% by weight of water was added with continuous agitation. It was noted that the final water addition, when induced into the vessel below the liquid level helps to keep down the formation of foam.

The resultant composition has a percentage of active ingredients of 0.122%

EXAMPLE 3

Into a mixing vessel, 25.07% of pre-mix water was placed. Then 2.25% by total weight of sodium lauryl sulfate was added, while the contents of the mixing vessel were continuously agitated. Then, 1.95% of cocamidopropyl betaine was added with continuous agitation. Subsequently, 0.25% of ethoxylated nonylphenol was added with continuous agitation. Further, 4.25% of lauric acid diethanolamide was added to the vessel with continuous slow agitation. Further, 1.85% by total weight of diethanolamine was added with continuous agitation of the contents of the vessel. Then, 1.85% by weight of propylene glycol was added to the vessel with continuous agitation.

Finally, 62.53% by weight of water was added with continuous agitation. It was noted that the final water addition, when induced into the vessel below the liquid level helps to keep down the formation of foam.

The resultant composition has a percentage of active ingredients of 12.4%.

The resultant compositions are fully biodegradable, non-toxic, serves as an oil dispersant and cleaner and can be used for various applications to clean oil in general, as well as in industrial applications. Depending on the ratio at which the present composition is diluted with water, the composition can be used in degreasing of household items (1:1 ratio), used as corrosion and rust inhibitor, general cleaner (1:5 ratio), coolant additive (1:20 ratio), etc.

While removing oil from heavy contaminated surfaces, one to one ratio can be selected, applying the composition of the present invention under pressure to the surface of the oil, in order to break apart and disperse oil particles. If more composition is added, the size of the particles decreases, allowing the oil to float to the surface (if used in water environment).

It has been found that the ratio of one milliliter of oil, one milliliter of cleaning agent of the present invention and ten milliliters of water work quite sufficiently.

All of the chemical agents are used safely in other general applications. Such, Sipon LSB is a low salt, high protein base agent used in shampoos, hand cleaners, cosmetic lotions and detergents. Cycloteric BET-C 30 is used as a foam booster, foaming agent, thickener and conditioning agent in shampoos, cosmetic and industrial applications. Siponic NP-9.5 is used as an emulsifier in a wide variety of personal care, household and industrial formulations. It is used as a detergent and wetting agent for heavy duty and light duty cleaner systems. It is used as primary and auxiliary surfactant for emulsion polymerization. Cyclomide LE is used as a performance and viscosity booster for shampoos, skin cleaners, detergents, dishwashers and general purpose cleaners. It is also used as industrial lubricant, anti-corrosion agent, dispersant, coupler and emulsifier.

The composition of the present invention does not substantially destroy microbial genera, allowing it to be used along with the cleaning agent of the present invention and continue its useful life upon interaction with the composition.

A test was conducted exposing Artemia Saline to oil alone and a mixture of 1:10 of oil and the cleaning agent of the present invention. The mortality Artemia Saline was 41% after 48 hours, while the mortality in the 1:10 mixture of oil and cleaning agent was 13% at 900 mg/L.

Various tests indicated that the ratio of ingredients set forth in Example 1 was preferable in most circumstances. However, the ratio of active ingredients of Examples 2 and 3 proved to work efficiently under certain conditions as well.

It can thus be seen that a novel and efficient cleaning agent has been devised for, inter alia, dispersing oil which is non-toxic and biodegradable. Moreover, it will be evident that the invention is not limited to the details of the foregoing illustrative examples and that changes can be made without departing from the scope of the invention.

We therefore pray that our rights to the present invention be limited only by the scope of the appended claims.

We claim:

1. An aqueous composition suitable for use as a cleaning agent or as an oil dispersant, comprising:
   sodium lauryl sulfate, from 0.02% to 2.25% by total weight;
   cocamidopropyl betaine, from 0.02% to 1.95% by total weight;
   ethoxylated nonylphenol, from 0.002% to 0.25% by total weight;
   lauric acid diethanolamide, from 0.04% to 4.25% by total weight;
   diethanolamine, from 0.02% to 1.85% by total weight; and
   propylene glycol, from 0.02% to 1.85% by total weight.

2. The oil dispersant of claim 1, wherein the solution contains at least 1.23% by total weight of diethanolamine.

3. The oil dispersant solution of claim 2, wherein the solution contains at least 1.2% by total weight of propylene glycol.

4. The cleaning agent of claim 2 wherein the active ingredients comprise 1.5% of sodium lauryl sulfate by total weight, 1.3% of cocamidopropyl betaine by total weight, 0.17% of ethoxylated nonylphenol by total weight, 2.83% of lauric acid diethanolamide by total weight, 1.23% of diethanolamine by total weight, 1.23% of propylene glycol by total weight and mixed in an aqueous base.

5. A process of manufacturing an oil dispersant, comprising the steps of:
   dissolving 1.5% by total weight of sodium lauryl sulfate in 25.07% percent by total weight of water;
   adding in sequence, while continuously agitating the solution, at least 1.3% by total weight of cocamidopropyl betaine, at least 0.17% by total weight of ethoxylated nonylphenol, at least 2.3% by total weight of lauric acid diethanolamide, at least 1.23% by total weight of diethanolamine, at least 1.23% by total weight of propylene glycol;
   adding with continuous agitation 66.67% by total weight of water, thus forming an aqueous solution having at least 8.26% by total weight of active ingredients.

6. A method of dispersing oil without destroying microbial genera, which comprises the step of dispersing on oil surface an aqueous solution, comprising:

- from 0.02% to 2.25% by total weight of sodium lauryl sulfate;
- from 0.02% to 1.95% by total weight of cocamidopropyl betaine;
- from 0.002% to 0.25% by total weight of ethoxylated nonylphenol;
- from 0.04% to 4.25% by total weight of lauric acid diethanolamide;
- from 0.02% to 1.85% by total weight of diethanolamine; and
- from 0.02% to 1.85% by total weight of propylene glycol.

7. The method of claim 6, wherein concentration of the active ingredients is at least 8.26% by total weight.

8. The method of claim 6, wherein the active ingredients comprise: 1.5% by total weight of sodium lauryl sulfate, 1.3% by total weight of cocamidopropyl betaine, 0.17% by total weight of ethoxylated nonylphenol, 2.83% by total weight of lauric acid diethanolamide, 1.23% by total weight of diethanolamine and 1.23% by total weight of propylene glycol mixed in an aqueous base.

* * * * *